L. A. BENECKE.
LIGHT OBSTRUCTER.
APPLICATION FILED SEPT. 20, 1913.

1,156,578.

Patented Oct. 12, 1915.
2 SHEETS—SHEET 1.

Witnesses:
Harry H. Reiss.
George G. Anderson.

Inventor:
Louis A. Benecke,
By Hugh K. Wagner
His Attorney.

L. A. BENECKE.
LIGHT OBSTRUCTER.
APPLICATION FILED SEPT. 20, 1913.

1,156,578.

Patented Oct. 12, 1915.

Witnesses:
Harry H. Reer.
George G. Anderson.

Inventor:
Louis A. Benecke,
By Hugh N. Wagner,
His Attorney.

UNITED STATES PATENT OFFICE.

LOUIS A. BENECKE, OF ST. LOUIS, MISSOURI.

LIGHT-OBSTRUCTER.

1,156,578. Specification of Letters Patent. Patented Oct. 12, 1915.

Application filed September 20, 1913. Serial No. 790,871.

*To all whom it may concern:*

Be it known that I, LOUIS A. BENECKE, a citizen of the United States, residing at the city of St. Louis, State of Missouri, have invented certain new and useful Improvements in Light-Obstructers, of which the following is a specification.

Drivers of motor vehicles are hindered in driving their machines at night, on account of the glaring light which the headlights of such vehicles, street-cars, locomotives, etc., throw, this often, being the cause of accidents and fatalities. For instance, when two motor vehicles are running toward each other in the dark with their headlights burning, the glaring light from the headlight of the approaching machine has such a blinding effect upon the driver of the other machine that it is impossible for the drivers to distinguish what is in front of their machines until the latter have nearly passed each other, an accident or a fatality sometimes resulting from one machine or both striking someone or something or being ditched.

It is the object of the present invention to provide the wind-shield of a motor vehicle with a light obstructer, which will shade the eyes of the driver from the glaring and blinding light from the headlight of another motor vehicle, street-car, locomotive, etc., and other bright lights, and will thereby enable the driver to distinguish what is in front of his machine, thus obviating the above-mentioned objectionable features and lessening the chances of accidents and fatalities.

With this object in view, the present invention consists of the provision of a light obstructer, which is particularly adapted for use on the wind-shield of a motor vehicle, though, of course, may be used on a window of a street-car vestibule, locomotive cab, and the like.

Further, the present invention consists of the novel features of construction and arrangement of parts hereinafter more fully described and pointed out in the claim.

Figure 1:
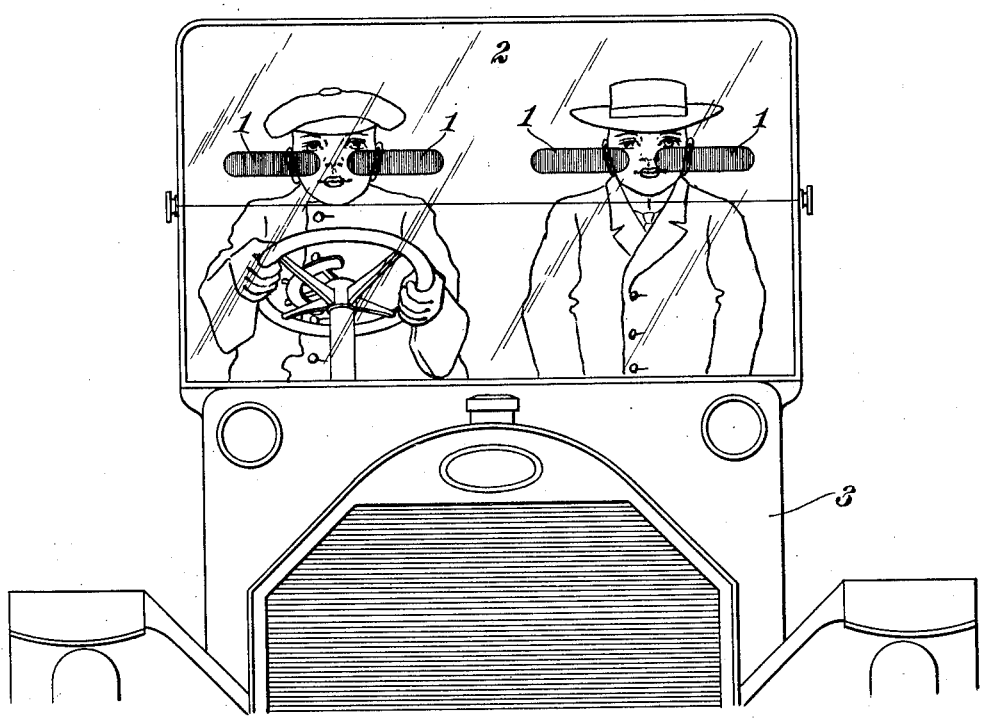
Figure 2:
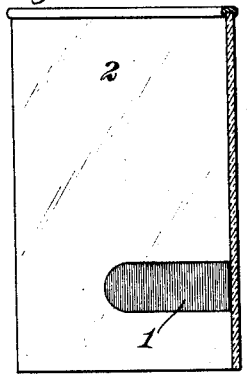
Figure 4:
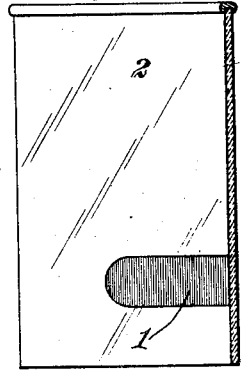
Figure 3:
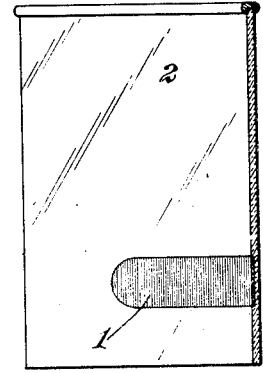
Figure 5:
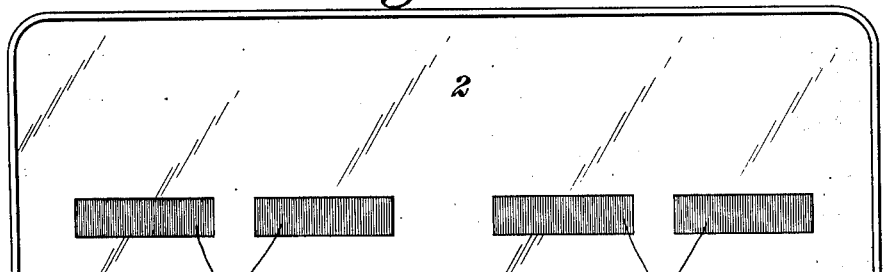
Figure 6:
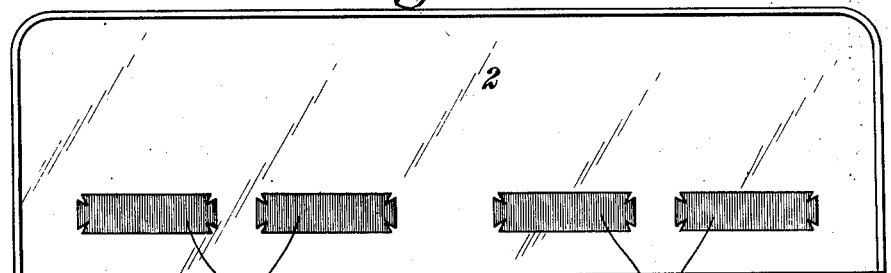
Figure 7:
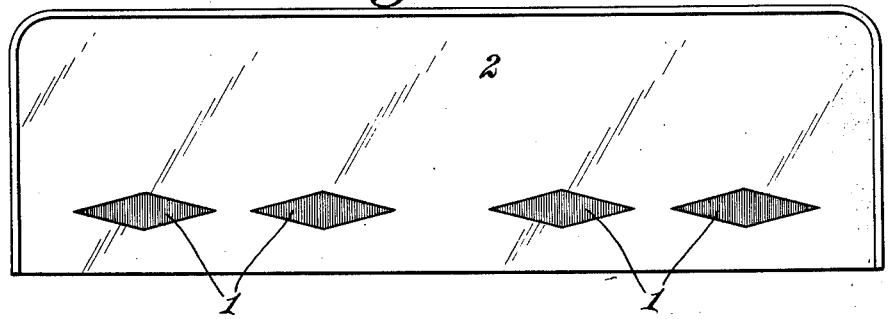

In the accompanying drawings forming part of this specification, in which like numbers of reference denote like parts wherever they occur, Figure 1 is a front view of an automobile, showing the wind-shield equipped with light obstructers, which embody the present invention; Figs. 2, 3, and 4 are perspective views, partly in section, of a portion of the wind-shield, showing three arrangements of the light obstructer; and Figs. 5, 6, and 7, are front elevations of the wind-shield, showing same equipped with alternate forms of the light obstructer.

The light obstructer 1 consists of a piece of translucent material or a plurality of such pieces, such as paper of any color, ground glass, colored glass, or the like in somewhat the shape of an ellipse which may be pasted, cemented, or otherwise secured to either the front face or rear face of the glass wind-shield 2 of a motor vehicle 3, as illustrated in Fig. 2, or same may be inlaid as depicted in Fig. 3, or, if desired, the elliptical light obstructer may be formed by etching, grinding, smoking, or painting same upon or blowing same in the glass wind-shield as shown in Fig. 4.

In practice, a pair of these light obstructers 1 is located directly in front of the driver's seat and slightly below the level of the driver's eyes, and another pair is similarly positioned directly in front of the passenger's seat, said light obstructers being preferably spaced apart with their major axes in horizontal alinement, as depicted in Fig. 1. By this arrangement, at night the light obstructers 1, which are located in front of the driver, shield the eyes of the latter from the glaring light from the headlight of a motor vehicle, street-car, locomotive, etc., approaching from the opposite direction, and, also, from other bright lights, it being obvious that by slight movement of the head the driver can keep his eyes in the shadow of the two light obstructers 1 directly in front of him, which enables him to distinguish the road and any one or anything in front of his machine, and in the daytime these light obstructers shield the eyes of the driver from the glaring sun light upon the streets, sidewalks, and other reflecting surfaces. In like manner, the two light obstructers in front of the passenger shield the eyes of the latter from the glaring light from headlights and other bright lights at night, and from the streets and the glaring sun in the daytime. Thus, these light obstructers not only afford a means for resting both the driver's and passenger's eyes, but, also, enables the driver to distinguish what is in front of his machine, thereby avoiding accidents and fatalities and making driving both at night and in daytime safer.

It should be understood that the translucency of the light obstructer may vary from a degree approaching transparency to a degree approaching opaqueness, or the light obstructers may, in fact, be opaque. Furthermore, while it is preferable to use elliptical-shaped light obstructers as hereinabove described, yet for the purpose of decoration as well as for obstructing or diffracting the light, the light obstructers may have any other desired configuration, such, for example, as illustrated in Figs. 5, 6, and 7.

Various other forms and modifications of the light obstructer or diffractor hereinabove described may be made without departing from the spirit and nature of the present invention.

It will be evident that, when these light obstructers are being applied to a windshield, their positions can be adjusted for either a tall or short person or a person of medium height.

I claim:

In combination with the glass wind shield of a motor vehicle, a plurality of light obstructers directly affixed in a permanent position on a face of the wind shield in spaced relation, with their major axes in horizontal alinement and disposed slightly lower than the line of vision.

In testimony whereof I hereunto affix my signature in the presence of two witnesses.

LOUIS A. BENECKE.

Witnesses:
HARRY H. REISS,
GEORGE G. ANDERSON.